United States Patent

Lumbard

[15] 3,665,635
[45] May 30, 1972

[54] COMBINED FISHHOOK KEEPER AND WINDING CHECK

[72] Inventor: Fredrick W. Lumbard, Los Angeles, Calif.
[73] Assignee: Milton J. Stevens, Glendale, Calif.
[22] Filed: Oct. 12, 1970
[21] Appl. No.: 79,939

[52] U.S. Cl. ................................................43/25.2
[51] Int. Cl. ...........................................A01k 87/00
[58] Field of Search ........................43/25.2, 25, 18

[56] References Cited

UNITED STATES PATENTS

| | | | |
|---|---|---|---|
| 2,556,403 | 6/1951 | Sokolik | 43/25.2 |
| 3,394,485 | 7/1968 | Wells et al. | 43/25.2 |
| 3,411,232 | 11/1968 | Rumbaugh | 43/25.2 |
| 3,425,150 | 2/1969 | Braese | 43/25.2 |

Primary Examiner—Warner H. Camp
Attorney—Hyman Jackman

[57] ABSTRACT

A stretchable, washer-like item for disposition on the inner end of the hand grip of a fishing rod and having the dual purpose of checking the winding usually applied to a fishing rod where the same extends from the grip and which serves to impart a finished appearance to the rod at that point, and as a keeper for the barbed fishhook on the end of the line of said rod.

4 Claims, 4 Drawing Figures

Patented May 30, 1972
3,665,635
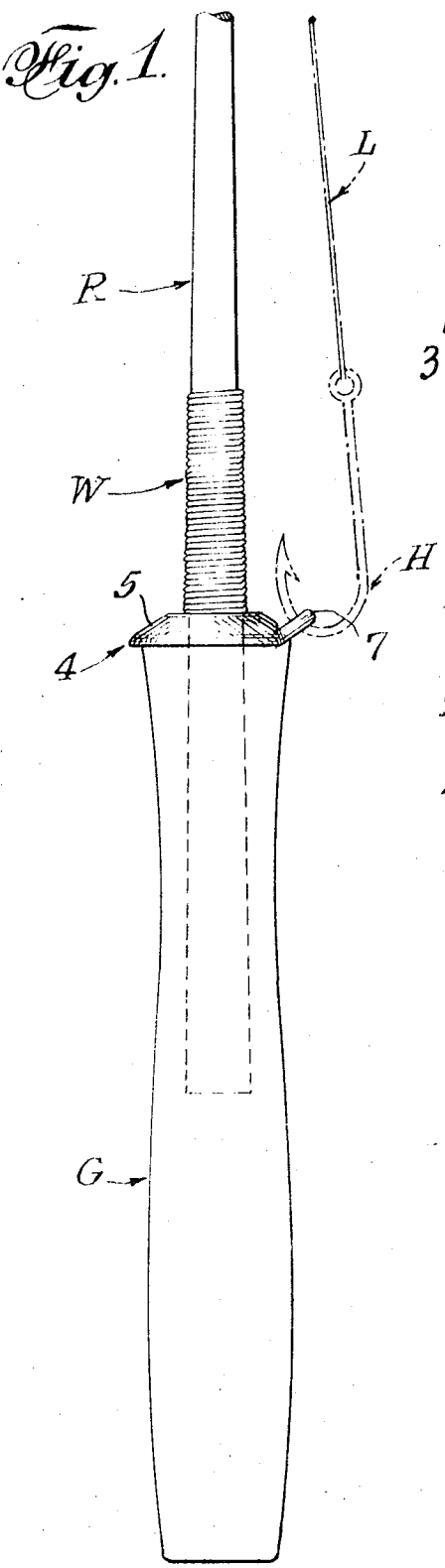
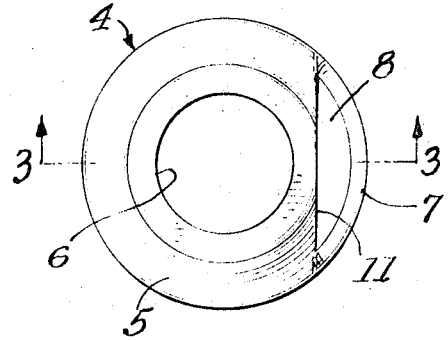
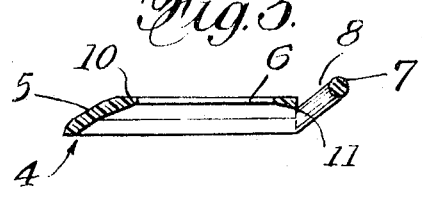
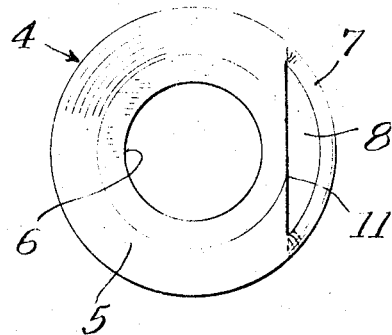
INVENTOR.
FREDRICK W. LUMBARD
BY
Hyman Jackman
ATTORNEY

3,665,635

COMBINED FISHHOOK KEEPER AND WINDING CHECK

BACKGROUND OF THE INVENTION

1. Field of the Invention

In fishing rod construction, in the area where the rod and hand grip are joined.

2. Description of the Prior Art

Metallic winding check rings are known, the same being strung over a fishing rod where said rod is joined to the hand grip (usually cork), and held in position on the inner end of said grip by the silk, nylon, or similar winding threads wrapped around and cemented to the rod by shellac or other such coating material.

Fishhook keepers are also known and take various forms. The same are usually made of cork or other non-metallic material and mounted on the rod independently of the metal winding check common to the art. The hooks are retained in place when the rod is out of use by empaling their barbs on these separate keepers.

SUMMARY OF THE INVENTION

The present combined fishhook keeper and winding check is formed of a synthetic resin or plastic, the primary properties of which are stretchability, toughness, and strength. Examples of such resins are polytetrafluoroethylane (Teflon), polystyrene, and polymethane resins (as distinct from foams).

The present combined utility item 4 comprises, generally, a preferably circular washer-like body 5 having a central aperture 6, and an edge portion 7 on said body, defining an opening 8.

An object of the invention is to provide an item as above generally described that combines the functions of fishhook keepers and winding checks to thereby replace two items that, in the past, separately provided these functions.

Another object of the invention is to provide a dual purpose item, as above characterized, that, due to its stretchability, may be produced and stocked in a small number of sizes to fit fishing rods of varying sizes, whereas prior metallic winding checks were required to be produced and stocked in a number of sizes corresponding to the rod sizes which, in practice, vary in 1/64th-inch increments, from 18/64 through 39/64 inch.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following specification merely describes one embodiment of the present invention which is given by way of illustration or example only.

In the drawing, like reference characters designate similar parts in the several views.

BRIEF DESCRIPTION OF THE DRAWING

FIG. 1 is a side elevational view of the grip end of a fishing rod showing the present combined fishhook keeper and winding check in operative position.

FIG. 2 is an enlarged top plan view of said combined item.

FIG. 3 is a cross-sectional view as taken on the line 3—3 of FIG. 2.

FIG. 4 is a bottom plan view of said item.

DESCRIPTION OF THE PREFERRED EMBODIMENT

FIG. 1 shows the present combined item 4 applied against the inner end of the usual cork hand grip G from which the fishing rod R extends, the latter being provided with a finishing winding W of silk, nylon or other such thread usually provided adjacent said grip and coated with shellac or other such coating. Said figure also shows a fishhook H on the end of a line L which extends from the tip of rod R, and in operative engagement with the present dual purpose item 4 and retained thereby safely out of possibility of damage to itself or the angler.

The body 5 of item 4 is preferably dished, as best shown in FIG. 3 to fit over the inner end of the hand grip G. The same, in the area of the aperture 6, is thinned out at 10 so that the size of said aperture will readily increase when being stretched by the rod R as the item 4 is applied from the smaller end of the rod and slid thereover toward the grip G. In practice, the item 4, chosen for a particular rod, will have its aperture either to have a snug or a tight fit, entailing stretch of the aperture, when slid into place over the grip end of the rod. In any case, the item will be firmly retained in place. The winding W may then be applied, as above indicated.

The keeper portion 7 is shown as an arcuate portion substantially conforming in circumference to the periphery of the body 5. The same is thickened somewhat for strength. Said body 5, on the opposite side of the opening 8, is defined by a chordal edge 11. It will be noted that the keeper portion 7 is upwardly angled, thereby raising the hook-engaging portion thereof away from the grip G, thereby enabling the angler to readily engage said portion 7 with a fishhook and as readily remove a fishhook so engaged.

It will be clear that the present item not only serves the purpose of prior metal winding checks, the same, within the periphery of the present check serves also as a fishhook keeper, and at no additional expense to the user. It will also be clear that the stretchability of the present item enables stocking a much fewer number of differently sized items than was the case with known winding checks which were required to be produced in a large number of sizes—one for each rod size. Further, the present combined item obviates the need of separate fishhook keepers and the need for separately mounting the same on a fishing rod.

While the foregoing has illustrated and described what is now contemplated to be the best mode of carrying out the invention, the construction is, of course, subject to modification without departing from the spirit and scope of the invention.

I claim:

1. A combined fishhook keeper and winding check comprising:

a dished washer-like body of stretchable plastic and having a substantially central aperture adapted to tightly fit over the portion of a fishing rod that is immediately adjacent to the hand grip of such rod, and an edge keeper portion integrally formed on said body adapted for hooking engagement with a fishhook on the end of a line extending from the end of said rod, an opening being defined between said body and edge portion through which the barb of a fishhook is adapted to be passed during said hooking engagement, the keeper portion comprising an arcuate portion forming part of the periphery of the combined item, and the keeper portion being upwardly angularly directed relative to the general plane of the body.

2. A combined fishhook keeper and winding check according to claim 1 in which the peripheral edge of the body and of the keeper portion combine to provide a circular peripheral edge on the combined item.

3. A combined fishhook keeper and winding check according to claim 1 in which the body is formed with a chordal edge, said edge and the keeper portion defining an opening through which the barb of the fishhook is adapted to be passed when engaging the latter with the present combined device.

4. A combined fishhook keeper and winding check according to claim 1 in which the portion of the body around the aperture therein is thinner and, therefore, more stretchable than the remainder of the body.

* * * * *